(12) United States Patent
Deroo et al.

(10) Patent No.: US 7,838,588 B2
(45) Date of Patent: Nov. 23, 2010

(54) DRIED EMULSION, METHOD FOR THE PRODUCTION THEREOF, AND ITS USES

(75) Inventors: Sophie Deroo, L'Hay les Roses (FR); Alain Senechal, Charenton (FR); Jean-Michel Mercier, Gouvieux (FR); Nadia Martin, Lyons (FR)

(73) Assignee: Rhodia Chimie, Aubervilliers (FR)

( * ) Notice: Subject to any disclaimer, the term of this patent is extended or adjusted under 35 U.S.C. 154(b) by 345 days.

(21) Appl. No.: 10/592,926

(22) PCT Filed: Mar. 15, 2005

(86) PCT No.: PCT/FR2005/000618

§ 371 (c)(1), (2), (4) Date: Apr. 18, 2008

(87) PCT Pub. No.: WO2005/100454

PCT Pub. Date: Oct. 27, 2005

(65) Prior Publication Data

US 2008/0255289 A1    Oct. 16, 2008

(30) Foreign Application Priority Data

Mar. 15, 2004    (FR) .................................. 04 02646

(51) Int. Cl.
*C08L 53/00* (2006.01)
*C08K 3/34* (2006.01)

(52) U.S. Cl. .................. 524/505; 524/442; 524/522; 524/516; 524/9; 424/401; 424/489

(58) Field of Classification Search .............. 424/401, 424/489; 524/505, 442, 522, 516
See application file for complete search history.

(56) References Cited

U.S. PATENT DOCUMENTS

| 4,542,025 A * | 9/1985 | Tice et al. .................... 424/497 |
| 5,766,635 A * | 6/1998 | Spenleuhauer et al. ...... 424/489 |
| 6,638,994 B2 * | 10/2003 | Crooks et al. ............... 523/122 |
| 2004/0170657 A1 * | 9/2004 | Morvan et al. .............. 424/401 |

FOREIGN PATENT DOCUMENTS

WO    WO 03002242 A1 *    1/2003

* cited by examiner

*Primary Examiner*—Satya B Sastri
(74) *Attorney, Agent, or Firm*—Hunton & Williams LLP

(57) ABSTRACT

The invention relates to a dried emulsion. In particular, the invention relates to a dried emulsion containing a liquid hydrophobic phase and a water-soluble or water-dispersible polymeric matrix whose hydrophobic phase content is high. The invention also relates to a method for producing the dried emulsion and to uses of this emulsion. The utilized water-soluble matrix contains block copolymers.

16 Claims, No Drawings

DRIED EMULSION, METHOD FOR THE PRODUCTION THEREOF, AND ITS USES

This application is an application under 35 U.S.C. Section 371 of International Application Number PCT/FR2005/000618 filed on Mar. 15, 2005.

The present invention relates to a dried emulsion. It relates more particularly to a dried emulsion comprising a liquid hydrophobic phase and a water-soluble or water-dispersible polymeric matrix and having a high hydrophobic-phase content. The invention also provides a process for preparing the dried emulsion, and for uses of said emulsion.

Dried emulsions are compositions comprising a liquid hydrophobic phase in dispersion in a solid matrix. They can be obtained by drying an emulsion comprising an aqueous phase having dispersed therein the liquid hydrophobic phase, the aqueous phase comprising the water-soluble or water-dispersible compound which will go to make up some or all of the matrix after drying. Compositions in dried emulsion form and the processes for their preparation are known to the skilled worker. Dried emulsions are generally in powder or granule form.

Known dried emulsions thus include those comprising a polymer electrolyte matrix, such as a polymer of acrylic acid, for example, as described in document WO 97/15385 (R 95139G1). Also known are dried emulsions whose matrix comprises a polymer comprising hydrophilic units and units comprising hydrophobic groups or grafts, as described in document WO 00/26280 (R 98145), WO 02/32563 (R 00137), and WO 03/006148 (R 01103). Likewise known are dried emulsions whose matrix is an optionally modified starch, as described in document WO 99/55819 or document U.S. Pat. No. 3,971,852. The use of other matrices is also described in documents WO 97/15386 (R 95140), WO 97/15387 (R 95141), WO 99/38611 (R 98011) and WO 99/38945 (R 98010). Also known is the use of polyvinyl alcohol.

Document WO 03/002242 describes the drying of emulsions comprising a hydrophobic phase in dispersion in an aqueous phase comprising a high level of glyphosate isopropylammonium salt and an amphiphilic block copolymer. Such drying leads to a matrix comprising a very high salt content. The presence of such salt contents is generally not useful, and therefore costly, for the applications for which the dried emulsions are intended. Moreover, it affects the behavior of the matrix. Preference is often given to avoiding the presence of high salt contents.

Dried emulsions are generally intended for dispersion in an aqueous composition to give an emulsion comprising the hydrophobic phase in dispersion in the aqueous composition. Dried emulsions may therefore facilitate or render economic the handling and/or transport and/or conveying and/or the protection of the hydrophobic phase. Dried emulsions can therefore be formulated with other solid compounds and can be combined with water by the end user. Thus it is possible, for example, to produce powder mixtures. This is the case, for example, for certain crop protection compositions, and for granular or powder detergent formulations. Dried emulsions can also be combined with water by an operative preparing an aqueous formulation comprising the hydrophobic phase. It is also noted that it may be of advantage to trigger the redispersion by an external factor (for example, a change in pH, in temperature, in chemical composition of the environment, via the release of aqueous substances such as urine or perspiration, etc) or to control the kinetics of the redispersion.

Qualities of a dried emulsion include the following: ready redispersion in water; absence of coalescence of the non-water-miscible hydrophobic phase during drying and/or on redispersion; good powder flow; and an easily handled form, not oily for example. Sometimes the matrix of the dried emulsions is not per se very useful in the formulation or the end use. It does, though, constitute a very substantial, at least temporary aid. The field of application of dried emulsions is therefore limited by the amount and the nature (and hence the cost) of the matrix, in balance with the benefit provided. The greater the amount of matrix there is, the less the advantage of this aid proves to be. To date there have been no known dried emulsions able to comprise less than 30% by weight of matrix while exhibiting a form that can be readily handled and/or satisfactory redispersion properties.

New dried emulsions have now been found which make it possible to resolve the abovementioned difficulties and to widen the fields of application of such emulsions.

The invention accordingly provides a dried emulsion comprising a matrix comprising a water-soluble or water-dispersible polymer and having dispersed therein a liquid hydrophobic phase, characterized in that:
  the water-soluble or water-dispersible polymer comprised in the matrix comprises a water-soluble or water-dispersible block copolymer comprising one or more hydrophilic blocks A and one or more hydrophobic blocks B, said copolymer being alone or in a mixture with another water-soluble or water-dispersible polymer,
  the weight ratio between the hydrophobic phase and the matrix is greater than 50/50, preferably greater than 70/30, preferably greater than 80/20, and
  the matrix comprises at least 50% by weight of water-soluble or water-dispersible polymer.

Preferably the matrix comprises not more than 20%, preferably not more than 10%, by weight of a salt.

The invention also provides also a process for preparing such emulsions, and uses.

DEFINITIONS

In the present application a water-soluble or water-dispersible polymer is a polymer which at a concentration of 10% by weight in water, at a temperature of 25° C., does not exhibit any macroscopic phase separation. In the present application the quality of being water-soluble or water-dispersible refers to the pH at which the dried emulsion is prepared and/or to the pH at which the dried emulsion is used on redispersion.

In the present application a hydrophobic phase is a compound or a composition comprising two or more compounds which is non-water-miscible (forming macroscopic phase separation) at a concentration of 10% by weight, at a temperature of 25° C. In the present application the quality of being a hydrophobic or water-dispersible phase refers to the pH at which the dried emulsion is prepared and/or to the pH at which the dried emulsion is used on redispersion.

In the present application a unit deriving from a monomer is a unit which may be obtained directly from said monomer by polymerization. Thus, for example, a unit deriving from an ester of acrylic or methacrylic acid does not cover a unit of formula —$CH_2$—CH(COOH)—, —$CH_2$—C($CH_3$)(COOH)—, —$CH_2$—CH(OH)—, respectively, which is obtained, for example, by polymerizing an ester of acrylic or methacrylic acid, or vinyl acetate, respectively, and then carrying out hydrolysis. A unit deriving from acrylic or methacrylic acid covers, for example, a unit obtained by polymerizing a monomer (for example, an ester of acrylic or methacrylic acid) and then by reacting (by hydrolysis, for example) the resulting polymer so as to give units of formula —CH$_2$—CH(COOH)—, or —CH$_2$—C(CH$_3$)(COOH)—. A unit deriving from a vinyl alcohol covers, for example, a unit obtained by polymerizing a monomer (for example, a vinyl ester) and then by reacting (by hydrolysis, for example) the resulting polymer so as to give units of formula —CH$_2$—CH(OH)—.

In the present application, unless mentioned otherwise, the average molar masses are number-average molar masses measured by steric exclusion chromatography in an appropriate solvent, coupled to a multiangle light scattering detector (GPC-MALLS). In the present application reference may also be made to theoretical average molar masses, which are determined from the masses of constituents used to prepare the polymers.

Typically the theoretical average molar mass M of a block, of a side chain, of a backbone, of peripheral chains or of a core is calculated according to the following formula:

$$M = \sum_i M_i * \frac{n_i}{n_{precursor}},$$

where $M_i$ is the molar mass of a monomer i, $n_i$ is the number of moles of the monomer i, and $n_{precursor}$ is the number of moles of a compound to which the macromolecular chain of the block, side chain, backbone, peripheral chain or core will be attached. This compound may be a transfer agent (or a transfer group) or an initiator, a preceding block, etc. If it is a preceding block, the number of moles can be considered to be the number of moles of a compound to which the macromolecular chain of said preceding block was attached, such as a transfer agent (or a transfer group) or an initiator, for example.

In the present application the term "hydrophobic block" is used in its usual sense of a block "which has no affinity for water"; this means that a polymer of which the block is composed would, taken alone (of the same composition and same molar mass), form a two-phase macroscopic solution in distilled water at 25° C., at a concentration of greater than 1% by weight.

In the present application the term "hydrophilic block" is likewise used in its usual sense of a block "which has affinity for water", which means that the block is not capable of forming a two-phase macroscopic solution in distilled water at 25° C. at a concentration of greater than 1% by weight.

Ingredients of the Dried Emulsion

The dried emulsion comprises a matrix comprising a water-soluble or water-dispersible polymer and having dispersed therein a liquid hydrophobic phase. The liquid hydrophobic phase is present in the form of inclusions (droplets) in the matrix, advantageously with an average size of between 0.1 and 50 µm, preferably between 1 and 10 µm, between 1 and 5 µm for example (determined by means of a Horiba laser scattering particle size instrument). The average size may vary depending on the end application.

Details are given below of various ingredients which may form part of the composition of the dry emulsion.

Hydrophobic Phase

The hydrophobic phase may comprise all kinds of compounds, alone or in mixtures, optionally in solution or in dispersion in a hydrophobic solvent. As will be appreciated, the hydrophobic phase may be composed only of a single hydrophobic liquid.

Examples of hydrophobic phase or of compounds comprised in the hydrophobic phase include the following:

silicones, such as silicone oils and silicone rubbers, for example, of type MD, MTD and/or MQ, which are optionally dissolved in solvents, and are optionally functionalized with groups such as amines, alcohols, polyols, etc. Silicones of this kind are known to the skilled worker.

fragrances.

organic, mineral or vegetable or mineral oils, and derivatives of these oils, said oils and derivatives being non-water-miscible.

non-water-miscible organic solvents.

non-water-soluble or -dispersible active substances, optionally dissolved in a solvent.

mixtures thereof, as solutions, dispersions or emulsions.

Within the agrochemical field the active crop protection substances may be selected from the class of α-cyanophenoxybenzylcarboxylates or α-cyanohalophenoxy-carboxylates, the class of N-methylcarbonates comprising aromatic substituents, and active substances such as aldrin, azinphos-methyl, benfluralin, bifenthrin, chlorphoxim, chlorpyrifos, fluchloralin, fluoroxypyr, dichlorvos, malathion, molinate, parathion, permethrin, profenofos, propiconazole, prothiofos, pyrifenox, butachlor, metolachlor, chlorimephos, diazinon, fluazifop-P-butyl, heptopargil, mecarbam, propargite, prosulfocarb, bromophos-ethyl, carbophenothion, cyhalothrin, novaluron, deltamethrin, and pendimethalin. The active crop protection substances may be employed in the presence of conventional additives selected for example from adjuvants which enhance the efficacy of the active substance, antifoams, anticaking agents, and fillers, water-soluble or otherwise.

As active substances which are suitable in the field of crop protection formulations mention may also be made of vegetable oils, mineral oils, silicone oils, silicone antifoams, etc.

Examples of active substances which can be used in the field of cosmetology include silicone oils belonging, in particular, to the class of dimethicones; lipophilic vitamins, such as vitamin A and its derivatives, vitamin B2, pantothenic acid, vitamin D, and vitamin E; mono-, di-, and triglycerides; fragrances; bactericides; UV absorbers, such as aminobenzoate derivatives of PABA and PARA type, salicylates, cinnamates, anthranilates, dibenzoylmethanes, camphor derivatives, and mixtures thereof.

Antiaging agents may also be used. Particular examples of such agents include retinoids, α- and β-hydroxy acids, salts thereof, and esters thereof, fat-soluble vitamins, ascorbyl palmitate, ceramides, pseudoceramides, phospholipids, fatty acids, fatty alcohols, cholesterol, sterols, and mixtures thereof. As preferred fatty acids and alcohols mention may be made more particularly of those which possess linear or branched alkyl chains containing 12 to 20 carbon atoms. The compound in question may in particular be linoleic acid.

It is likewise possible to employ anticellulite agents, such as, in particular, isobutylmethylxanthine and theophylline; and also antiacne agents, such as, for example, resorcinol, resorcinol acetate, benzoyl peroxide, and numerous natural compounds.

Aromas, fragrances, essential oils, and essences may also be used as a hydrophobic active substance. By way of example mention may be made of oils and/or essences of mint, spearmint, peppermint, menthol, vanilla, cinnamon, bay, aniseed, eucalyptus, thyme, sage, cedar leaf, nutmeg, citrus (lemon, lime, grapefruit, orange), fruits (apple, pear, peach, cherry, plum, strawberry, raspberry, apricot, pineapple, grape, etc), alone or as mixtures.

Antimicrobial agents may be selected from thymol, menthol, triclosan, 4-hexylresorcinol, phenol, eucalyptol, benzoic acid, benzoyl peroxide, butyl paraben, and mixtures thereof.

Examples of active substances which are suitable for the invention and can be used in the field of paints include alkyd resins, epoxy resins, and blocked or nonblocked isocyanates.

In the paper field mention may be made, inter alia, of resins such as alkylketene dimer (AKD) or alkenylsuccinic anhydride (ASA).

In the detergents field mention may be made, as possible active substance, of amino silicone softeners, silicone antifoams, antimicrobial agents, fragrances, oils, and essences, etc. In this regard reference may be made to the list of compounds of this type which were indicated in the context of active substances for the field of cosmetology.

Among the suitable hydrophobic active substances mention may also be made of the following:
organic oils/fats/waxes of animal origin or of plant origin;
mineral oils/waxes;
products obtained from the alcoholysis of the aforementioned oils;
mono-, di-, and tri-glycerides;
saturated or unsaturated fatty acids containing 10 to 40 carbon atoms; the esters of such acids with an alcohol containing 1 to 6 carbon atoms;
saturated or unsaturated monoalcohols containing 8 to 40 carbon atoms;

these compounds being used alone or as a mixture.

As organic oils/fats/waxes of animal origin mention may be made, inter alia, of cachalot oil, whale oil, seal oil, shark oil, cod liver oil, lard and mutton fat (tallows), perhydrosqualene, and beeswax, alone or as a mixture.

As examples of organic oils/fats/waxes of plant origin mention may be made, inter alia, of rapeseed oil, sunflower oil, peanut oil, olive oil, walnut oil, corn oil, soybean oil, avocado oil, linseed oil, hemp oil, grapeseed oil, copra oil, palm oil, cottonseed oil, oil palm oil, babassu oil, jojoba oil, sesame oil, castor oil, macadamia oil, sweet almond oil, carnauba wax, shea butter, cocoa butter, and peanut butter, alone or as a mixture.

With regard to the mineral oils/waxes, mention may be made, inter alia, of naphthenic oils, paraffin oils (vaseline), and isoparaffin oils, and of paraffin waxes, alone or as a mixture.

The products obtained from the alcoholysis of the aforementioned oils may also be used.

With regard to the fatty acids, saturated or unsaturated, they contain 10 to 40 carbon atoms, more particularly 18 to 40 carbon atoms, and may comprise one or more conjugated or nonconjugated ethylenic unsaturations. It should be noted that said acids may comprise one or more hydroxyl groups.

Examples of saturated fatty acids that may be mentioned include palmitic acid, stearic acid, isostearic acid, and behenic acid.

Examples of unsaturated fatty acids that may be mentioned include myristoleic acid, palmitoleic acid, oleic acid, erucic acid, linoleic acid, linolenic acid, arachidonic acid, and ricinoleic acid, and mixtures thereof.

As far as the fatty acid esters are concerned, mention may be made of the esters of the acids listed above, for which the moiety deriving from the alcohol contains 1 to 6 carbon atoms, such as methyl esters, ethyl esters, propyl esters, isopropyl esters, etc.

Mention is made that the hydrophobic phase may comprise a non-water-miscible intermediate phase having dispersed therein an internal phase which is not miscible or not soluble in the intermediate phase. In this case the emulsion may be referred to as a multiple dried emulsion.

Mention is made that the hydrophobic phase may be composed of a silicone oil, in particular an amino silicone oil, having dissolved therein a fragrance, a flavor or an essence.

As will be appreciated, this is not to rule out the dried emulsion comprising two or more different hydrophobic phases dispersed in the matrix, forming two populations of inclusions.

Water-Soluble or Water-Dispersible Polymer

The water-soluble or water-dispersible polymer comprised in the matrix comprises a water-soluble or water-dispersible block copolymer comprising one or more hydrophilic blocks A and one or more hydrophobic blocks B, said copolymer being alone or in a mixture with another water-soluble or water-dispersible polymer.

If the matrix comprises a mixture of the block copolymer and another water-soluble or water-dispersible polymer, the proportion by weight of block copolymer in the mixture may be less than 50%.

Preferentially at least one block, preferably at least two, derives from ethylenically unsaturated monomers, preferably mono-alpha-ethylenically unsaturated monomers. The water-soluble or water-dispersible block copolymer is preferably an A-B diblock copolymer or A-B-A triblock copolymer wherein the block A is hydrophilic and the block B is hydrophobic.

The block copolymer or mixture may be present in particular in the form of a powder, in the form of a dispersion in a liquid, or in the form of a solution in a solvent (water or otherwise).

Hydrophilic Block A

Block A comprises hydrophilic, nonionic, ionic (cationic, anionic, potentially cationic, potentially anionic or zwitterionic) or potentially ionic units derived from hydrophilic, nonionic, ionic or potentially ionic monomers. Block A may also comprise hydrophobic units derived from at least one hydrophobic monomer, in a sufficiently low amount for the block to retain a hydrophilic character. This amount may range up to 10 mol % of the totality of the monomers from which block A derives.

The expression "cationic or potentially cationic units $A_C$" is intended to mean units that comprise a cationic or potentially cationic group. The cationic units or groups are units or groups that have at least one positive charge (generally associated with one or more anions such as the chloride ion, the bromide ion, a sulfate group, a methyl sulfate group), whatever the pH of the medium in which the copolymer is present. The potentially cationic units or groups are units or groups that may be neutral or may have at least one positive charge according to the pH of the medium in which the copolymer is present. In this case, reference will be made to potentially cationic units $A_C$ in neutral form or in cationic form. By extension, reference may be made to cationic or potentially cationic monomers.

The expression "anionic or potentially anionic units $A_A$" is intended to mean units that comprise an anionic or potentially anionic group. The anionic units or groups are units or groups that have at least one negative charge (generally associated with one or more cations such as cations of alkali metal or alkaline earth metal, for example sodium, compounds, or cationic groups such as ammonium), whatever the pH of the medium in which the copolymer is present. The potentially anionic units or groups are units or groups that may be neutral or may have at least one negative charge according to the pH of the medium in which the copolymer is present. In this case, reference will be made to potentially anionic units $A_A$ in neutral form or in anionic form. By extension, reference may be made to anionic or potentially anionic monomers.

The term "neutral units $A_N$" is intended to mean units that have no charge, whatever the pH of the medium in which the copolymer is present.

By way of examples of nonionic hydrophilic monomers, mention may be made of:

hydroxyalkyl esters of α,β-ethylenically unsaturated acids, such as hydroxyethyl or hydroxypropyl acrylates and methacrylates, glyceryl monomethacrylate, etc., α,β-ethylenically unsaturated amides such as acrylamide, N,N-dimethylmethacrylamide, N-methylol-acrylamide, etc., α,β-ethylenically unsaturated monomers bearing a water-soluble polyoxyalkylene segment of the poly(ethylene oxide) type, such as poly(ethylene oxide)α-methacrylates (Bisomer S20W, S10W, etc., from Laporte) or α,ω-dimethacrylates, Sipomer BEM from Rhodia (ω-behenyl polyoxyethylene methacrylate), Sipomer SEM-25 from Rhodia (ω-tristyrylphenyl polyoxyethylene methacrylate), etc., α,β-ethylenically unsaturated monomers which are precursors of hydrophilic units or segments, such as vinyl acetate, which, once polymerized, can be hydrolyzed in order to give rise to vinyl alcohol units or polyvinyl alcohol segments, vinylpyrrolidones, α,β-ethylenically unsaturated monomers of the ureido type, and in particular 2-imidazolidinone-ethyl methacrylamide (Sipomer WAM II from Rhodia).

Examples of ionic or potentially ionic monomers that can be used in a minor amount are mentioned below (with regard to part A).

By way of examples of potentially cationic hydrophilic monomers (from which units $A_C$ can derive), mention may be made of:

N,N-(dialkylamino-ω-alkyl)amides of α,β-monoethylenically unsaturated carboxylic acids, such as N,N-dimethylaminomethylacrylamide or -methacrylamide, 2-(N,N-dimethylamino)ethylacrylamide or -methacrylamide, 3-(N,N-dimethylamino)propylacrylamide or -methacrylamide, and 4-(N,N-dimethylamino)butylacrylamide or -methacrylamide, α,β-monoethylenically unsaturated amino esters such as 2-(dimethylamino)ethyl acrylate (DMAA), 2-(dimethylamino)ethyl methacrylate (DMAM), 3-(dimethylamino)propyl methacrylate, 2-(tert-butyl-amino)ethyl methacrylate, 2-(dipentylamino)ethyl methacrylate, and 2-(diethylamino)ethyl methacrylate, vinylpyridines, vinylamine, vinylimidazolines, monomers that are precursors of amine functions such as N-vinylformamide, N-vinylacetamide, etc., which give rise to primary amine functions by simple acid or base hydrolysis.

By way of examples of cationic hydrophilic monomers, from which units $A_C$ can derive, mention may be made of:

acryloyl- or acryloyloxyammonium monomers such as trimethylammoniopropyl methacrylate chloride, trimethylammonioethylacrylamide or -methacrylamide chloride or bromide, trimethylammoniobutylacrylamide or -methacrylamide methyl sulfate, trimethylammoniopropylmethacrylamide methyl sulfate (MES), (3-methacrylamidopropyl)trimethylammonium chloride (MAPTAC), (3-acrylamidopropyl)trimethylammonium chloride (APTAC), methacryloyloxyethyltrimethylammonium chloride or methyl sulfate, and acryloyloxyethyltrimethylammonium chloride;

1-ethyl-2-vinylpyridinium or 1-ethyl-4-vinylpyridinium bromide, chloride or methyl sulfate;

N,N-dialkyldiallylamine monomers such as N,N-di-methyldiallylammonium chloride (DADMAC);

polyquaternary monomers such as dimethylaminopropylmethacrylamide chloride and N-(3-chloro-2-hydroxypropyl)trimethylammonium (DIQUAT), etc.

Examples of hydrophilic or hydrophobic nonionic (neutral) monomers, from which units $A_N$ can derive, have already been mentioned above (with regard to part B).

By way of examples of anionic or potentially anionic monomers, from which units $A_A$ can derive, mention may be made of:

monomers having at least one carboxylic function, for instance α,β-ethylenically unsaturated carboxylic acids or the corresponding anhydrides, such as acrylic, methacrylic or maleic acids or anhydrides, fumaric acid, itaconic acid, N-methacroylalanine, N-acryloylglycine, and their water-soluble salts, monomers that are precursors of carboxylate functions, such as tert-butyl acrylate, which, after polymerization, give rise to carboxylic functions by hydrolysis, monomers having at least one sulfate or sulfonate function, such as 2-sulfooxyethyl methacrylate, vinylbenzenesulfonic acid, allylsulfonic acid, 2-acrylamido-2-methylpropanesulfonic acid, sulfoethyl acrylate or methacrylate, sulfopropyl acrylate or methacrylate, and their water-soluble salts, monomers having at least one phosphonate or phosphate function, such as vinylphosphonic acid, etc., the esters of ethylenically unsaturated phosphates, such as the phosphates derived from hydroxyethyl methacrylate (Empicryl 6835 from Rhodia) and those derived from polyoxyalkylene methacrylates, and their water-soluble salts.

By way of examples of zwitterionic monomers, from which units $A_Z$ can derive, mention may be made of:

sulfobetaine monomers, such as sulfopropyldimethylammonioethyl methacrylate (SPE from Raschig), sulfopropyldimethylammoniopropylmethacrylamide (SPP from Raschig), and sulfopropyl-2-vinylpyridinium (SPV from Raschig), phosphobetaine monomers, such as phosphatoethyl-trimethylammonioethyl methacrylate, carboxybetaine monomers.

Hydrophobic Block B

Block B comprises hydrophobic units which are generally nonionic. Block B may also comprise hydrophilic units derived from at least one hydrophilic monomer, in an amount sufficiently low for the block to retain a hydrophobic character. This amount may range up to 10 mol % of the entirety of the monomers from which block B derives.

By way of examples of hydrophobic nonionic monomers from which part B (for example, block B) can derive, mention may be made of:

vinylaromatic monomers such as styrene, alpha-methylstyrene, vinyltoluene, etc., vinyl halides or vinylidene halides, such as vinyl chloride, vinylidene chloride, $C_1$-$C_{12}$ alkylesters of α,β-monoethylenically unsaturated acids such as methyl, ethyl or butyl acrylates and methacrylates, 2-ethylhexyl acrylate, etc., vinyl esters or allyl esters of saturated carboxylic acids, such as vinyl or allyl acetates, propionates, versatates, stearates, etc., α,β-monoethylenically unsaturated nitriles containing from 3 to 12 carbon atoms, such as acrylonitrile, methacrylonitrile, etc., α-olefins such as ethylene, etc., conjugated dienes, such as butadiene, isoprene, chloroprene, monomers capable of generating polydimethylsiloxane (PDMS) chains.

Thus, part B can be a silicone: for example, a polydimethylsiloxane chain or a copolymer comprising dimethylsiloxy units.

The copolymers according to the invention can be obtained by any known method, whether by controlled or non-controlled radical polymerization, by ring-opening polymerization (in particular anionic or cationic), by anionic or cationic polymerization, or alternatively by chemical modification of a polymer.

Preferably, "living" or "controlled" radical polymerization methods are employed.

By way of example of "living" or "controlled" polymerization processes, reference may in particular be made to:

the processes of applications WO 98/58974, WO 00/75207, and WO 01/42312, which employ a radical polymerization controlled by control agents of xanthate type, the process for radical polymerization controlled by control agents of dithioester type of application WO 98/01478, the process described in application WO 02/08307, in particular for obtaining copolymers comprising polyorganosiloxane blocks, the process for radical polymerization controlled by control agents of dithiocarbamate type of application WO 99/31144, the process for radical polymerization controlled by control agents of dithiocarbazate type of application WO 02/26836, the process for radical polymerization controlled by control agents of application WO 03/082928, the process for radical polymerization controlled by control agents of dithiophosphoro ester type of application WO 02/10223, (optionally, the block copolymers obtained as above by controlled radical polymerization can undergo a reaction for purification of their sulfur-containing chain end, by means for example of processes of the hydrolysis, oxidation, reduction, pyrolysis or substitution type);

the process of application WO 99/03894, which employs a polymerization in the presence of nitroxide precursors, the process of application WO 96/30421, which uses atom transfer radical polymerization (ATRP), the process for radical polymerization controlled by control agents of iniferter type according to the teaching of Otu et al., Makromol. Chem. Rapid Commun., 3, 127 (1982), the process for radical polymerization controlled by degenerative transfer of iodine according to the teaching of Tatemoto et al., Jap. 50, 127, 991 (1975), Daikin Kogyo Co Ltd Japan and Matyjaszewski et al., Macromolecules, 28, 2093 (1995), the process for radical polymerization controlled by tetraphenylethane derivatives, disclosed by D. Braun et al., in Macromol. Symp. 111, 63 (1996), or the process for radical polymerization controlled by organocobalt complexes described by Wayland et al., in J. Am. Chem. Soc. 116, 7973 (1994), the process for radical polymerization controlled by diphenylethylene (WO 00/39169 or WO 00/37507).

The weight ratio between the block(s) A and the block(s) B is preferably greater than or equal to 50/50. The total molar mass is between 1000 and 100 000, preferably between 2000 and 40 000, preferably between 3000 and 20 000.

According to particularly advantageous embodiments:

the hydrophobic phase comprises a fatty acid ester and the block copolymer is a diblock comprising:
a block A deriving from acrylic acid (PAA) and a block B deriving from butyl acrylate (PABU), or
a block A deriving from acrylamide (PAM) and a block B deriving from butyl acrylate (PABU), or
a block A deriving from acrylic acid (PAA) and a block B deriving from vinyl acetate (PVAc).

the hydrophobic phase comprises a silicone and the block copolymer is a diblock comprising:
a block A deriving from acrylic acid (PAA) and a block B deriving from butyl acrylate (PABU), or
a block A deriving from polyvinylpyrrolidone (PVP) and a block B deriving from butyl acrylate (PABU).

the hydrophobic phase comprises a silicone and the block copolymer is a triblock comprising two blocks A deriving from acrylic acid (PAA) and one polydimethyl-organosiloxane (PDMS) block B.

Other water-soluble or water-dispersible polymers which can be used as a mixture include, for example, copolymers of diisobutylene and maleic anhydride (in acid form or in the form of carboxylates, such as sodium carboxylate, for example), an example being Geropon EGPM, sold by Rhodia. Mention may also be made of starch derivatives, polypeptides, polyvinyl alcohol and its derivatives, and casein. Water-soluble or water-dispersible polymers are described in particular in documents WO 97/15385 (R 95139G1), WO 00/26280 (R 98145), WO 02/32563 (R 00137), WO 03/006148 (R 01103), WO 99/55819, U.S. Pat. No. 3,971,852, WO 97/15386 (R 95140), WO 97/15387 (R 95141), WO 99/38611 (R 98011), and WO 99/38945 (R 98010).

According to one advantageous embodiment a mixture is employed of a copolymer ("other copolymer") of diisobutylene and maleic anhydride (in acid form or in the form of carboxylates, such as sodium carboxylate, for example) and of a block copolymer in a weight ratio (other copolymer/block copolymer) of preferably between 95/5 and 5/95, preferably between 90/10 and 10/90, for example, approximately 80/20. According to this embodiment the matrix advantageously does not comprise salt, or less than 10% by weight. It is possible to observe a synergy between the two polymers, in terms of (high) weight ratio between the hydrophobic phase and the matrix: it is possible to obtain higher weight ratios with the mixtures than with the single polymers taken in isolation. Furthermore, the presence of the other copolymer allows an excellent quality of powder (not sticky) to be obtained. Indeed, with the mixtures, a surprising compromise is observed between the proportion of hydrophobic phase, the quality of the powder, the aptitude for redispersion, and even, where appropriate, the cost.

According to one advantageous embodiment the matrix comprises from 5% to 100% by weight of the block copolymer and from 0% to 95% by weight of another water-soluble or water-dispersible copolymer, preferably a copolymer of diisobutylene and maleic anhydride (in acid form or in the form of carboxylates, such as sodium carboxylate, for example), the total being 100%. These proportions are preferably from 10% to 90% for the block copolymer and from 10% to 90% of the other polymer; for example, approximately 20% of block copolymer and 80% of the other copolymer. The proportions in the mixtures may be varied as a function of the hydrophobic phase, and in accordance with the objectives to be attained in terms of redispersion (more block copolymer), sticking (more of the other copolymer), amount of hydrophobic phase (more of block copolymer), and, where appropriate, cost.

Additional Emulsifier

The dried emulsion may further comprise an emulsifier, such as a nonionic or anionic surfactant, for example.

The nonionic surfactants may be selected from polyalkoxylated nonionic surfactants, such as, for example:
- polyalkoxylated fatty alcohols;
- polyalkoxylated triglycerides;
- polyalkoxylated fatty acid esters;
- polyalkoxylated sorbitan esters;
- polyalkoxylated fatty acid amides;
- polyalkoxylated fatty amines;
- polyalkoxylated amidoamines;
- polyalkoxylated di(1-phenylethyl)phenols;
- polyalkoxylated tri(1-phenylethyl)phenols;
- polyalkoxylated alkylphenols;
- polyalkoxylated polysiloxanes;
- products resulting from the condensation of ethylene oxide or propylene oxide with ethylenediamine;
- polyalkoxylated terpenic hydrocarbons;
- polyalkoxylated alkylpolyglycosides, alone or as mixtures.

(Poly)alkoxylates denote ethoxy and propoxy units or combinations thereof. The surfactants preferably comprise ethoxy units or ethoxy/propoxy units.

The number of ethoxy (EO) and/or propoxy (PO) units in these surfactants varies commonly from 1 to 100, more particularly from 1 to 50.

The EO or EO/PO fatty alcohols contain generally 6 to 22 carbon atoms, the EO and PO units being excluded from these numbers. Preferably these units are ethoxy (EO) units.

The EO or EO/PO fatty acids contain generally 6 to 22 carbon atoms, the EO and PO units being excluded from these numbers. Preferably these units are ethoxy (EO) units.

The EO or EO/PO, preferably EO, triglycerides are more particularly triglycerides of plant or animal origin, such as, for example, linseed oil, soybean oil, castor oil, rapeseed oil, etc.

The EO or EO/PO fatty acid esters contain generally, for the acid part, 6 to 22 carbon atoms, the EO and PO units being excluded from these numbers, and are preferably ethoxylated (EO).

The EO or EO/PO, preferably EO, sorbitan esters are more particularly cyclized sorbitol fatty acid esters containing 10 to 20 carbon atoms, such as lauric acid, stearic acid or oleic acid.

The term "EO or EO/PO triglyceride" is directed in the present invention not only to the products obtained by alkoxylating a triglyceride with ethylene oxide and/or with propylene oxide but also to those obtained by transesterifying a triglyceride with a polyethylene glycol and/or polypropylene glycol.

Similarly, the term "EO or EO/PO fatty acid ester" includes not only the products obtained by alkoxylating a fatty acid with ethylene oxide and/or propylene oxide but also those obtained by transesterifying a fatty acid with a polyethylene glycol and/or polypropylene glycol.

The EO or EO/PO amines and fatty amides have generally 6 to 22 carbon atoms, the EO and PO units being excluded from these numbers, and are preferably ethoxylated (EO).

The EO or EO/PO amidoamines have commonly 2 to 22 carbon atoms for the hydrocarbon units, the EO and PO units being excluded from these numbers, and are preferably ethoxylated (EO).

The EO or EO/PO alkylphenols are conventionally 1 or 2, linear or branched alkyl groups having 4 to 12 carbon atoms. Particular examples include octyl, nonyl or dodecyl groups.

The polysiloxanes, which are preferably ethoxylated (EO), are more particularly linear or branched polyalkylsiloxanes containing 2 to 10 silicon atoms, and in which the alkyl groups are preferably methyl radicals.

The appropriate terpenic hydrocarbons, preferably EO or EO/PO, are in particular those derived from α- or β-pinenes. They have been described in international application WO 96/01245.

The alkylpolyglycosides may be obtained by condensing glucose with primary fatty alcohols having a $C_4$-$C_{20}$ alkyl group and an average number of glucose units of the order of 0.5 to 3 per mole of alkylpolyglycoside.

With regard to the anionic surfactants, mention may be made in particular of the following:
- alkyl ester sulfonates, of formula R—CH($SO_3$M)—$CH_2$COOR', for example, where R represents a $C_8$-$C_{20}$, preferably $C_{10}$-$C_{16}$, hydrocarbon radical, optionally bearing one or more unsaturations, R' represents a $C_1$-$C_6$, preferably $C_1$-$C_3$, alkyl radical, and M is a hydrogen atom, an alkali metal (sodium, potassium, lithium), alkaline-earth metal (calcium, for example) or unsubstituted or substituted ammonium (methyl-, dimethyl-, trimethyl-, tetramethylammonium, dimethylpiperidinium, etc.) cation or one derived from an alkanolamine (monoethanolamine, diethanolamine, triethanolamine, etc.). Mention may be made very particularly of methyl ester sulfonates wherein the radical R is $C_{14}$-$C_{16}$;
- alkyl ester sulfates, of formula R—CH($OSO_3$M)-$CH_2$COOR', for example, where R represents a $C_8$-$C_{20}$, preferably $C_{10}$-$C_{16}$, hydrocarbon radical, optionally bearing one or more unsaturations, R' represents a $C_1$-$C_6$, preferably $C_1$-$C_3$, alkyl radical, and M is as defined above;
- alkylbenzenesulfonates, more particularly $C_9$-$C_{20}$ alkylbenzenesulfonates, primary or secondary alkylsulfonates, especially $C_8$-$C_{22}$ alkylsulfonates, and alkylglycerolsulfonates;
- alkyl sulfates of formula $ROSO_3$M, for example, where R represents a $C_{10}$-$C_{24}$, preferably $C_{12}$-$C_{20}$, alkyl or hydroxyalkyl radical and M is as defined above;
- alkylether sulfates, of formula $RO(AO)_nSO_3$M, for example, where R represents a $C_{10}$-$C_{24}$, preferably $C_{12}$-$C_{20}$, alkyl or hydroxyalkyl radical, AO represents an ethoxylated and/or propoxylated group, M is as defined above, and n varies generally from 1 to 4, such as, for example, the lauryl ether sulfate with n=2;
- alkylamide sulfates, of formula $RCONHR'OSO_3$M, for example, where R represents a $C_2$-$C_{22}$, preferably $C_6$-$C_{20}$, alkyl radical, R' represents a $C_2$-$C_3$ alkyl radical, and M is as defined above, and also their polyalkoxylated (ethoxylated and/or propoxylated) derivatives;
- salts of saturated or unsaturated fatty acids, such as $C_8$-$C_{24}$, preferably $C_{14}$-$C_{20}$, salts, for example, with a cation having the same definition as M, N-acyl-N-alkyltaurates, alkylisethionates, alkylsuccinamates, monoesters or diesters of sulfosuccinates, N-acylsarcosinates, and polyethoxycarboxylates; and alkyl- or dialkyl-sulfosuccinates, such as, for example, $C_6$-$C_{24}$ alkyl- or dialkyl-sulfosuccinates, the cation having the same definition as M, and especially sodium dioctylsulfosuccinates;

phosphate monoesters and diesters, of the following formula, for example: $(RO)_x$—$P(=O)(OM)_{x'}$ where R represents an alkyl, alkylaryl, arylalkyl, or aryl radical, these radicals being optionally poly-alkoxylated, x and x' are 1 or 2, with the proviso that the sum of x and x' is 3, and M is as defined above, these esters being derived in particular from polyalkoxylated fatty alcohols, from polyalkoxylated di- and tri(1-phenylethyl)phenols, and polyalkoxylated alkylphenols;

alone or as mixtures.

Other Compounds

The dried emulsion may comprise other ingredients, which may be useful in the course of its preparation, or which may be useful for the purpose of modifying its properties or applications.

The ingredients in question may in particular be active ingredients (by which are meant ingredients having a function during use, as in a liquid formulation, for example), which are comprised in the matrix and can be formulated in an aqueous phase.

The ingredients may also be antifoam agents, saccharides as described in document WO 03/055584 (R 01186), or complexing agents comprising at least one of the elements from groups IIA, IVA, VA, VIII, IB, and IIIB, which make it easier to control the release of the hydrophobic phase in the case of redispersion in water, as described in document WO 03/006148 (R 01103).

The dried emulsion may optionally comprise residual water. The water content is advantageously less than 10% by weight, more preferably less than 3%.

Process

Step a) Preparation of the Emulsion

In a first step of the process, an emulsion is prepared which comprises the liquid hydrophobic phase in dispersion in the aqueous phase. The emulsion comprises the water-soluble or water-dispersible polymer and optionally, further, an emulsifier.

All the methods of preparing an emulsion may be used. They are known to the skilled worker. Methods are described in, for example, "Encyclopedia of Emulsions Technology", volumes 1 to 3, by Paul Becher, published by Marcel Dekker Inc., 1983, and may be employed in the context of the present invention.

Accordingly, the so-called direct-phase emulsification method may be used. It is briefly recalled that this method consists in preparing a mixture containing water and emulsifiers, including the water-soluble or water-dispersible polymer, and then in introducing the hydrophobic phase in liquid form, with stirring.

Another appropriate method is that of emulsification by phase inversion. According to this route, the hydrophobic phase is mixed with an emulsifier and the water, which possibly contains the other constituents such as the water-soluble or water-dispersible polymer, for example, is introduced dropwise with stirring. When a certain quantity of water has been introduced, the emulsion undergoes inversion. This gives a direct oil-in-water emulsion. The emulsion obtained is then diluted in water to give an appropriate volume fraction in dispersed phase.

It is possible, lastly, to prepare the emulsion by employing colloid mills such as Manton Gaulin and Microfluidizer (Microfluidics) mills.

The average size of the droplets of hydrophobic phase dispersed in the aqueous phase is generally between 0.1 and 50 µm, often between 1 and 10 micrometers, and preferably between 0.2 and 5 micrometers (expressed relative to the particle volume; measured by means of a Horiba laser scattering particle size instrument).

The emulsification may be carried out at a temperature close to ambient temperature, although higher or lower temperatures may be envisaged.

According to a first embodiment, the emulsion comprises the aqueous phase, the hydrophobic phase and the water-soluble or water-dispersible polymer, without supplementary addition of an emulsifier. In this embodiment the polymer may have an emulsifier function in addition to its function as future matrix after drying.

According to a second embodiment, the emulsion comprises the aqueous phase, the hydrophobic phase, the water-soluble or water-dispersible polymer, and, in addition, an emulsifier other than the polymer, a surfactant for example. In this embodiment a function of the emulsifier is to aid the emulsification and/or to participate in controlling the size of the droplets of the aqueous phase. Through this embodiment it is generally possible to obtain emulsions in which the size of the droplets of hydrophobic phase is more restricted (more effective emulsification).

The amount of water present in the emulsion before drying may be between 5% and 99% by weight, preferably between 20% and 70% by weight. Generally speaking it is preferred to use small amounts of water, because the water has to be removed subsequently.

Steps b), c), and d) Drying, Conversion

The method employed for removing the water from the emulsion and obtaining the dried emulsion may involve any means known to the skilled worker.

This operation takes place such that the various elements which make up the mixture are subjected to temperatures which are lower than the temperatures at which they break down.

According to a first embodiment of the invention, oven drying may be envisaged. This drying preferably takes place in a thin film. More particularly, the temperature at which drying is carried out is less than or equal to 100° C., preferably between 30 and 90° C., preferably between 50 and 90° C.

According to another particular embodiment of the invention, the mixture (or the emulsion) is subjected to rapid drying. Rapid drying appropriately includes spray-drying, in a fluidized bed, employing Duprat® drums, or lyophilization (freezing/sublimation).

Spray-drying, by means for example of a Niro apparatus, or drying in a fluidized bed, by means for example of an Aeromatic apparatus, may take place commonly in any known apparatus such as, for example, a spray-drying tower, which combines spraying carried out via a nozzle or a turbine with a stream of hot gas. The admission temperature of the hot gas (generally air), at the top of the column, is preferably between 50° C. and 250° C., and the exit temperature is preferably lower than the breakdown temperature of the elements which make up the granules obtained.

In the case of operations for drying the mixture (or the emulsion) which are carried out by means of a Duprat® drum, or any means which make it possible to obtain rapidly a dry film which is separated from the drying support by a scraping operation for example, particles are obtained which may, optionally, be ground. If necessary, these particles may be subjected to subsequent conversion, such as an agglomeration step, so as to give granules.

It should be noted that additives, such as anticaking agents, may be incorporated into the granules at the time of this drying step.

It is advisable to make use, by way of example, of a filler selected in particular from calcium carbonate, barium sulfate, kaolin, silica, bentonite, titanium oxide, talc, hydrated alumina, and calcium sulfo-aluminate.

Drying is preferably carried out such that at least 90% by weight of the external aqueous phase is removed, preferably between 90% and 95% by weight. Preferably the water comprises less than 0.5 mol/L of salt. The amount of residual water is preferably less than 3% by weight.

Uses:

The dried emulsion may be used:
- in crop-protection formulations;
- in laundrycare formulations, as for example in tablet or powder detergents, for formulating softeners, the conveying of fragrances, the formulation of antifoams, or of silicones, for the purpose for example of deposition on fibers (of the laundry, typically), or of silicones comprising fragrances, aromas or essences, for the purpose for example of deposition on fibers (of the laundry, typically);
- in automatic dishwashing formulations in tablet or powder form;
- in cosmetic formulations;
- generally, in woven or nonwoven textile articles, more particularly
  - in household wipes,
  - in skincare wipes,
  - in babycare wipes,
  - in diaper pants,
  - in makeup remover wipes,
  - in bath-salt formulations;
- in building-material and/or civil-engineering formulations, for the purpose for example of formulating cement setting retardants or accelerators;
- in surface-coating formulations, as in paints, for example; or
- for solid-form formulation of silicone oils, such as antifoams, for example.

Other details or advantages of the invention will emerge in light of the examples which follow without limitative effect.

EXAMPLES

Ingredients

| Ingredients: | | |
|---|---|---|
| Block polymer 1 | PABU-PAA 1k-4k | Diblock polymer synthesized by xanthate-controlled radical polymerization |
| Block polymer 2 | PABU-PVP 1k-4k | |
| Block polymer 3 | PAA-PDMS-PAA 7k-1, 3k-7k | |
| Comparative polymer 1 | Polyvinyl alcohol | Rhodoviol 25/140, Kuraray |
| Comparative polymer 2 | Maleic anhydride-diisobutylene copolymer | Geropon EGPM, Rhodia |
| Hydrophobic phase 1 | Silicone oil | Rhodorsil H1669, Rhodia |

-continued

| Ingredients: | | |
|---|---|---|
| Hydrophobic phase 2 | Silicone oil | Rhodiarsil 47V100, Rhodia |
| Hydrophobic phase 3 | MDT silicone resin 0.5% OH | Rhodorsil 4509D, Rhodia |
| Surfactant 1 | Nonionic surfactant Trideceth 8 EO | Rhodasurf ROX, Rhodia |
| Aqueous phase | Distilled water | |

Examples 1-3

Dried emulsions are prepared by one of the following procedures:

Procedure 1:

Dissolve the block polymer in water.

Add the hydrophobic phase with stirring with an Ultra-Turrax stirrer rotating at 13 500 rpm. Following the addition, continue stirring for 2 minutes.

Pour the resulting emulsion into a flat-based metal vessel to give a layer of emulsion around 1 mm thick.

Place the vessel in an oven at 70° C. until maximum removal of the water present in the emulsion (verification by weighing to constant weight).

Procedure 2:

Dissolve the surfactant in a part of the weight of water.

Add the hydrophobic phase with stirring with an Ultra-Turrax stirrer rotating at 13 500 rpm. Following the addition, continue stirring for 2 minutes.

Run the emulsion for 3 passes under a pressure of 200 bars through a Microfluidizer homogenizer in order to reduce its particle size.

Add the block polymer, which has been dissolved beforehand in the remainder of the water, with stirring (Ultra-Turrax at 9500 rpm for 30 seconds).

Pour the resulting emulsion into a flat-based metal vessel to give a layer of emulsion around 1 mm thick.

Place the vessel in an oven at 70° C. until maximum removal of the water present in the emulsion (verification by weighing to constant weight).

Emulsions Before Drying:

| Ingredients | Example 1 | Example 2 | Example 3 |
|---|---|---|---|
| Block polymer 1 | 8% by weight | 4.8% by weight | |
| Block polymer 2 | | | 7.4% by weight |
| Surfactant 1 | | 0.5% by weight | 0.5% by weight |
| Hydrophobic phase 1 | 40% by weight | | |
| Hydrophobic phase 2 | | 38.0% by weight | 37.0% by weight |
| Water | 52% by weight | 56.7% by weight | 55.1% by weight |

Dried Emulsions:

| Ingredients | Example 1 | Example 2 | Example 3 |
|---|---|---|---|
| Block polymer 1 | 16.7% by weight | 11.1% by weight | |
| Block polymer 2 | | | 16.5% by weight |
| Surfactant 1 | | 1.1% by weight | 1.1% by weight |
| Hydrophobic phase 1 | 83.3% by weight | | |
| Hydrophobic phase 2 | | 87.8% by weight | 82.4% by weight |
| Water | <3% by weight | <3% by weight | <3% by weight |

Evaluation:

Emulsions Before Drying:

| | Example 1 | Example 2 | Example 3 |
|---|---|---|---|
| D50* before drying | 1.4 µm | 0.9 µm | 0.9 µm |
| Macroscopic appearance after drying - redispersion in water | Dry and homogeneous film - no coalescence. Redispersion easy | Dry and homogeneous film - no coalescence. Redispersion easy | Slightly sticky and homogeneous film - no coalescence. Redispersion easy |
| D50* after drying and redispersion** | 1.5 µm | 1.1 µm | 0.9 µm |

*D50: Median diameter of the emulsified droplets, measured with a Horiba laser scattering particle size instrument
**Redispersion: The film of dried emulsion is coarsely ground (0.5 to 2 µm). 0.5 g of the resulting powder is added to 4.5 g of water in a 10 ml flask. The flask is stirred for 1 minute by simple inversion. At the end of stirring, dispersion is complete.

Examples 4-7

80% emulsions of hydrophobic phase 3 in water, stabilized with the block polymer 3 (example 4), are prepared by adding, gradually, the hydrophobic phase 3 to an aqueous solution (in water; pH 10) of block polymer 3, using an Ultra-Turrax at 13 500 rpm.

For comparison, 80% emulsions of hydrophobic phase 3, stabilized with a conventional nonionic surfactant (surfactant 1) (comparative example 5), are prepared by adding, gradually, the hydrophobic phase 3 to an aqueous solution of surfactant 1 using an Ultra-Turrax at 13 500 rpm.

The characteristics of the emulsions are summarized in the table below:

| Ingredients | Example 4 | Example 5 (comparative) |
|---|---|---|
| Block polymer 3 (% by weight/hydrophobic phase) | 5% (9.62 g at 16% in water) | |
| Surfactant 1 (% by weight/hydrophobic phase) | | 5% by weight (1.82 g at 85% in water) |
| Hydrophobic phase 3 | 30.78 g 80%/emulsion | 30.95 g 80%/emulsion |
| Appearance of the emulsion | semifluid | compact |
| Average diameter (µm) | 4.7 | 0.7 |

The average particle size is determined using a Coulter LS130 particle size instrument.

These emulsions are dried on a glass plate at ambient temperature and in an oven at 105° C. to form a film.

The results are as follows:

| | Example 4 | Comparative example 5 |
|---|---|---|
| Drying at ambient, film appearance | white, nonsticky, brittle | transparent, soft, oily |
| Drying at ambient, particles visible under microscope | yes | no |
| Drying in oven, film appearance | white, nonsticky, brittle | transparent, soft, oily |
| Drying in oven, particles visible under microscope | yes | no |
| Drying at ambient, rehydration of the film | easy | impossible |
| Drying in oven, rehydration of the film | easy | impossible |

The films before and after rehydration are observed using an Olympus BX 60 optical microscope (1 graduation=8.23 µm)

Dried emulsions are produced similarly with comparative polymers.

| Ingredients | Example 6 (comparative) | Example 7 (comparative) |
|---|---|---|
| Comparative polymer 1 (% by weight/hydrophobic phase) | 5% (15.4 g at 10% in water) | |
| Comparative polymer 2 (% by weight/hydrophobic phase) | | 5% (3.3 g at 16% in water) |
| Hydrophobic phase 3 | 30 g 80%/emulsion | 30.78 g 80%/emulsion |
| Appearance of the emulsion | compact | semifluid |
| Average diameter (µm) | 3.33 | 6.86 |

The average particle size is determined using a Coulter LS130 particle size instrument.

| | Example 6 (comparative) | Example 7 (comparative) |
|---|---|---|
| Drying at ambient, film appearance | semitransparent, nonsticky, not smooth | transparent, soft, oily |
| Drying at ambient, particles visible under microscope | yes | yes |
| Drying in oven, film appearance | semitransparent, nonsticky, not smooth | transparent, soft, oily |
| Drying in oven, particles visible under microscope | no | yes |
| Drying at ambient, rehydration of the film | easy | easy, but oily; particles accumulated at the surface |
| Drying in oven, rehydration of the film | impossible | easy, but oily; particles accumulated at the surface |

The films before and after rehydration are observed using an Olympus BX 60 optical microscope (1 graduation=8.23 μm)

The invention claimed is:

1. A dried emulsion comprising a matrix and a liquid hydrophobic phase,
   wherein said liquid hydrophobic phase is dispersed in said matrix, and
   said matrix comprises at least 50% by weight of a water-soluble or water-dispersible polymer,
   further wherein:
   the water-soluble or water-dispersible polymer comprises a water-soluble or water-dispersible block copolymer comprising one or more hydrophilic blocks A and one or more hydrophobic blocks B, said block copolymer being alone or in a mixture with another water-soluble or water-dispersible polymer; and
   the weight ratio of the hydrophobic phase to the matrix is greater than 50/50.

2. The dried emulsion of claim 1, further comprising an emulsifier compound.

3. The dried emulsion of claim 1, wherein the matrix comprises at least 80% by weight of water-soluble or water-dispersible polymer.

4. The dried emulsion of claim 1, wherein the matrix comprises not more than 20% by weight of a salt.

5. The dried emulsion of claim 1,
   wherein said silicones, fragrances, or oils comprise non-water-miscible organic solvents or non-water-soluble or -dispersible active substances as solutions, dispersions, or emulsions.

6. The dried emulsion of claim 5, wherein the hydrophobic phase is a composition comprising a non-water-miscible intermediate phase having dispersed therein an internal phase which is not miscible or not soluble in the intermediate phase.

7. The dried emulsion of claim 1, wherein the weight ratio of the block(s) A to the block(s) B is greater than or equal to 50/50.

8. The dried emulsion of claim 1, wherein the water-soluble or water-dispersible polymer is an A-B diblock copolymer or A-B-A triblock copolymer wherein the block A is hydrophilic and the block B is hydrophobic.

9. The dried emulsion of claim 1, wherein at least one block, optionally at least two, is a block deriving from ethylenically unsaturated monomers, optionally mono-alpha-ethylenically unsaturated monomers.

10. A process for preparing the dried emulsion of claim 1, comprising the following steps:
    a) preparing an emulsion comprising:
    the liquid hydrophobic phase dispersed in an aqueous phase, the water-soluble or water-dispersible polymer, and optionally, an emulsifier compound,
    b) removing the water to yield a dried emulsion,
    c) optionally converting the dried emulsion into powder or granules, and
    d) recovering the dried emulsion the hydrophobic phase comprises silicones, fragrances, organic, mineral or vegetable oils or mixtures thereof.

11. The process of claim 10, wherein in step b) the water is removed by thin-film evaporation, lyophilization, or by spray-drying the emulsion.

12. The process of claim 10, wherein the proportion by weight of the aqueous phase and the hydrophobic phase ranges from 5% to 99%, and wherein the water comprises less than 0.5 mol/L of salt.

13. A crop protection formulation, a laundry care formulation, a dishwashing formulation, a cosmetic formulation, a household or skincare or babycare wipe, a diaper pant, or a building-material comprising the dried emulsion of claim 1.

14. The dried emulsion of claim 1, wherein the weight ratio of the hydrophobic phase to the matrix is greater than 70/30.

15. The dried emulsion of claim 14, wherein the weight ratio of the hydrophobic phase to the matrix is greater than 80/20.

16. The dried emulsion of claim 4, wherein the matrix comprises not more than 10% by weight of a salt.

* * * * *